(12) United States Patent
Miyasaka et al.

(10) Patent No.: US 8,610,748 B2
(45) Date of Patent: Dec. 17, 2013

(54) DRIVING METHOD FOR ELECTROPHORETIC DISPLAY DEVICE, ELECTROPHORETIC DISPLAY DEVICE, AND ELECTRONIC APPARATUS

(75) Inventors: Eiji Miyasaka, Suwa (JP); Shigeaki Seki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 387 days.

(21) Appl. No.: 12/913,146

(22) Filed: Oct. 27, 2010

(65) Prior Publication Data

US 2011/0102480 A1 May 5, 2011

(30) Foreign Application Priority Data

Nov. 4, 2009 (JP) ................. 2009-252767

(51) Int. Cl.
*G09G 5/10* (2006.01)
(52) U.S. Cl.
USPC ............................. 345/690; 345/107; 345/209
(58) Field of Classification Search
USPC ........................ 345/690, 107, 209
See application file for complete search history.

(56) References Cited

U.S. PATENT DOCUMENTS

| | | | |
|---|---|---|---|
| 7,518,782 B2 | 4/2009 | Maeda | |
| 7,973,740 B2 | 7/2011 | Masutani et al. | |
| 8,264,454 B2 * | 9/2012 | Kim et al. | 345/107 |
| 8,354,994 B2 | 1/2013 | Sato | |
| 2007/0080926 A1 | 4/2007 | Zhou et al. | |
| 2007/0262949 A1 * | 11/2007 | Zhou et al. | 345/107 |
| 2008/0224989 A1 | 9/2008 | Zhou et al. | |
| 2009/0231267 A1 | 9/2009 | Uchida | |

FOREIGN PATENT DOCUMENTS

| | | |
|---|---|---|
| JP | 2005-331936 A | 12/2005 |
| JP | 2007-512571 A | 5/2007 |
| JP | 2007-187938 A | 7/2007 |
| JP | 2007-519045 A | 7/2007 |
| JP | 2007-206471 A | 8/2007 |
| JP | 2008-033241 A | 2/2008 |
| JP | 2008-070546 A | 3/2008 |
| JP | 2009-163167 A | 7/2009 |
| JP | 2009-222901 A | 10/2009 |

* cited by examiner

*Primary Examiner* — William Boddie
*Assistant Examiner* — Leonid Shapiro
(74) *Attorney, Agent, or Firm* — ALG Intellectual Property, LLC

(57) ABSTRACT

Disclosed is a method for driving an electrophoretic display device including a first electrode, a second electrode facing the first electrode, and an electrophoretic element disposed between the first electrode and the second electrode. The method includes a display driving step of inputting a first potential to the first electrode and inputting a second potential different from the first potential to the second electrode, and a reverse potential driving step of applying a voltage to the electrophoretic element, the voltage having a polarity which is opposite to a polarity of the potential in the display driving step.

17 Claims, 12 Drawing Sheets

DRIVING METHOD FOR ELECTROPHORETIC DISPLAY DEVICE, ELECTROPHORETIC DISPLAY DEVICE, AND ELECTRONIC APPARATUS

BACKGROUND

1. Technical Field

The present invention relates to a driving method for an electrophoretic display device, the electrophoretic display device, and an electronic apparatus.

2. Related Art

In an electrophoretic display device, a driving method for performing a display by intermittently applying a DC pulse-like voltage to an electrophoretic element, which is interposed between a first electrode and a second electrode, plural times in order to reduce the time required for display switching has been proposed in the art (for example, refer to JP-A-2008-70546).

However, in the driving method disclosed in JP-A-2008-70546, an interval when the pulse-like voltage is intermittently applied is larger than a pulse width of the pulse-like voltage. That is, in the driving method, at the time of display switching, the time for which the voltage is applied to the electrophoretic element is set to be shorter than the time for which the voltage is not applied to the electrophoretic element. Therefore, the driving method does not provide a fundamental solution for reducing the display switching time.

SUMMARY

An advantage of some aspects of the invention is to provide a method for driving an electrophoretic display device, which can reduce the time required for display switching, and the electrophoretic display device.

According to a first aspect of the invention, there is provided a method for driving an electrophoretic display device including a display unit having an electrophoretic element interposed between a pair of substrates, a plurality of arranged pixels, a plurality of pixel electrodes formed at a side of the electrophoretic element of one of the substrates in correspondence with the pixels, and a common electrode formed at a side of the electrophoretic element of the other one of the substrates while facing the plurality of pixel electrodes, wherein an image display step of displaying an image on the display unit includes: a display driving step of inputting a first potential to the pixel electrodes and inputting a second potential different from the first potential to the common electrode; and a reverse potential driving step of applying a voltage to the electrophoretic element, the voltage having a polarity which is opposite to a polarity of the potential in the display driving step.

According to the driving method, since the reverse potential driving step is provided, electrophoretic particles included in the electrophoretic element can be driven while being appropriately stirred, so that a response speed can be improved. Consequently, the time required for display switching can be reduced.

Furthermore, the time for which electrophoretic particles temporarily move in an opposite direction is provided through the reverse potential driving step, so that electrophoretic particles of a color other than a display color cannot move while being surrounded by electrophoretic particles of the display color, resulting in the prevention of a reduction in contrast. Consequently, according to the present invention, the improvement of contrast can also be achieved.

In the image display step, preferably, the display driving step and the reverse potential driving step are alternately performed plural times. Consequently, stirring performance of electrophoretic particles can be improved and superior responsiveness can be achieved.

In the image display step, preferably, whenever the display driving step is performed plural times, the reverse potential driving step is performed at least once. When a plurality of pulses cannot be continuously input to the pixel electrodes, the ratio of the display driving step and the reverse potential driving step may also be set in step units. Such a driving method, for example, is suitable for a DRAM type electrophoretic display device.

Preferably, a pulse width of a pulse-like voltage input to the pixel electrodes in the reverse potential driving step is narrower than a pulse width of a pulse-like voltage input to the pixel electrodes in the display driving step.

In the reverse potential driving step, since an operation different from the original display operation is performed with respect to pixels, it is necessary to shorten the pulse width of the pulse-like voltage in the reverse potential driving step as compared with the pulse width of the pulse-like voltage in the display driving step as described above in order to achieve a desired display.

Preferably, the pulse width of the pulse-like voltage input to the pixel electrodes in the reverse potential driving step is equal to or more than 10 ms and equal to or less than 20 ms.

Using such a driving method, it is possible to prevent a change in a display color or a flicker due to the operation of the reverse potential driving step from being recognized by a user.

Preferably, the image display step is ended in the display driving step.

Using such a driving method, it is possible to reliably achieve a display with desired grayscale, shorten the period in which the reverse potential driving step is performed once, and reduce the time and power required for an image display.

Preferably, the driving method further includes an image holding step of allowing the pixel electrodes and the common electrode to be in a high impedance state after the image display step, wherein the image holding step is started by changing the potentials of the pixel electrodes and the common electrode to be in the high impedance state from a final state of the image driving step which is included in the image display step.

According to such a driving method, in the image holding step, during the period until the potentials of the pixel electrode and the common electrode coincide with each other (converged to each other), an electric field of a certain degree can be applied to the electrophoretic particles and a display can be reinforced. For example, in the case of a white display, brightness can be further increased. In the case of a black display, brightness can be further reduced.

Preferably, in the image display step, all pixels of the display unit are changed to the same grayscale.

That is, the driving method of the present invention may also be applied to an image removal operation.

According to a second aspect of the invention, there is provided an electrophoretic display device including: a display unit having an electrophoretic element interposed between a pair of substrates, a plurality of arranged pixels, a plurality of pixel electrodes formed at a side of the electrophoretic element of one of the substrates in correspondence with the pixels, and a common electrode formed at a side of the electrophoretic element of the other one of the substrates while facing the plurality of pixel electrodes; and a controller that controls driving of the pixels, wherein, when performing an image display operation for displaying an image on the display unit, the controller performs a potential writing operation for inputting a first potential to the pixel electrodes and for inputting a second potential different from the first potential to the common electrode, and a reverse potential driving operation for applying a voltage to the electrophoretic element, the voltage having a polarity which is opposite to a polarity of the potential in the inputting of the first potential and the second potential.

With such a configuration, since the reverse potential driving operation is provided, electrophoretic particles included in the electrophoretic element can be driven while being appropriately stirred, so that a response speed can be improved. Consequently, the time required for display switching can be reduced.

Furthermore, the time for which electrophoretic particles temporarily move in an opposite direction is provided through the reverse potential driving operation, so that electrophoretic particles of a color other than a display color cannot move while being surrounded by electrophoretic particles of the display color, resulting in the prevention of a reduction in contrast. Consequently, according to the present invention, the improvement of contrast can also be achieved.

In the image display operation, preferably, the potential writing operation and the reverse potential driving operation are alternately performed plural times. Consequently, stirring performance of electrophoretic particles can be improved and superior responsiveness can be achieved.

In the image display operation, preferably, whenever the potential writing operation is performed plural times, the reverse potential driving operation is performed at least once. When a plurality of pulses cannot be continuously input to the pixel electrodes, the ratio of the display driving operation and the reverse potential driving operation may also be set according to the respective number of times as described above.

Preferably, a pulse width of a pulse-like voltage input to the pixel electrodes in the reverse potential driving operation is narrower than a pulse width of a pulse-like voltage input to the pixel electrodes in the potential writing operation. Consequently, a display with desired grayscale can be reliably achieved.

Preferably, in the pulse width of the pulse-like voltage input to the pixel electrodes in the reverse potential driving operation is equal to or more than 10 ms and is equal to or less than 20 ms. Consequently, it is possible to prevent a change in a display color or a flicker due to the reverse potential driving operation from being recognized by a user.

Preferably, the image display operation is ended in the potential writing operation. Consequently, it is possible to reliably achieve a display with desired grayscale and shorten the period in which the reverse potential driving operation is performed once.

Preferably, the electrophoretic display device further includes an image holding operation for allowing the pixel electrodes and the common electrode to be in a high impedance state after the image display operation, wherein the image holding operation is started by changing the potentials of the pixel electrodes and the common electrode to be in the high impedance state from a final state of the potential writing operation, which is included in the image display operation.

Consequently, in the image holding operation, during the period until the potentials of the pixel electrode and the common electrode coincide with each other (converged to each other), an electric field of a certain degree can be applied to electrophoretic particles and a display can be reinforced. For example, in the case of a white display, brightness can be further increased. In the case of a black display, brightness can be further reduced.

Preferably, in the image display operation, all pixels of the display unit are changed to the same grayscale. That is, at the time of an image removal operation, the display driving operation and the reverse potential driving operation may also be performed.

An electronic apparatus of the present invention is provided with the above-described electrophoretic display device.

With such a configuration, it is possible to provide an electronic apparatus including a display means capable of performing display switching in a short time.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment in accordance with the present invention will be described with reference to the accompanying drawings.

The scope of the present invention is not limited to the following embodiments, and various modified examples can be made within the technical features of the present invention. Furthermore, in the following drawings, for the purpose of a clear explanation of elements, the sizes and the number of the elements may be reduced or magnified from the real structure thereof.

Figure 1:
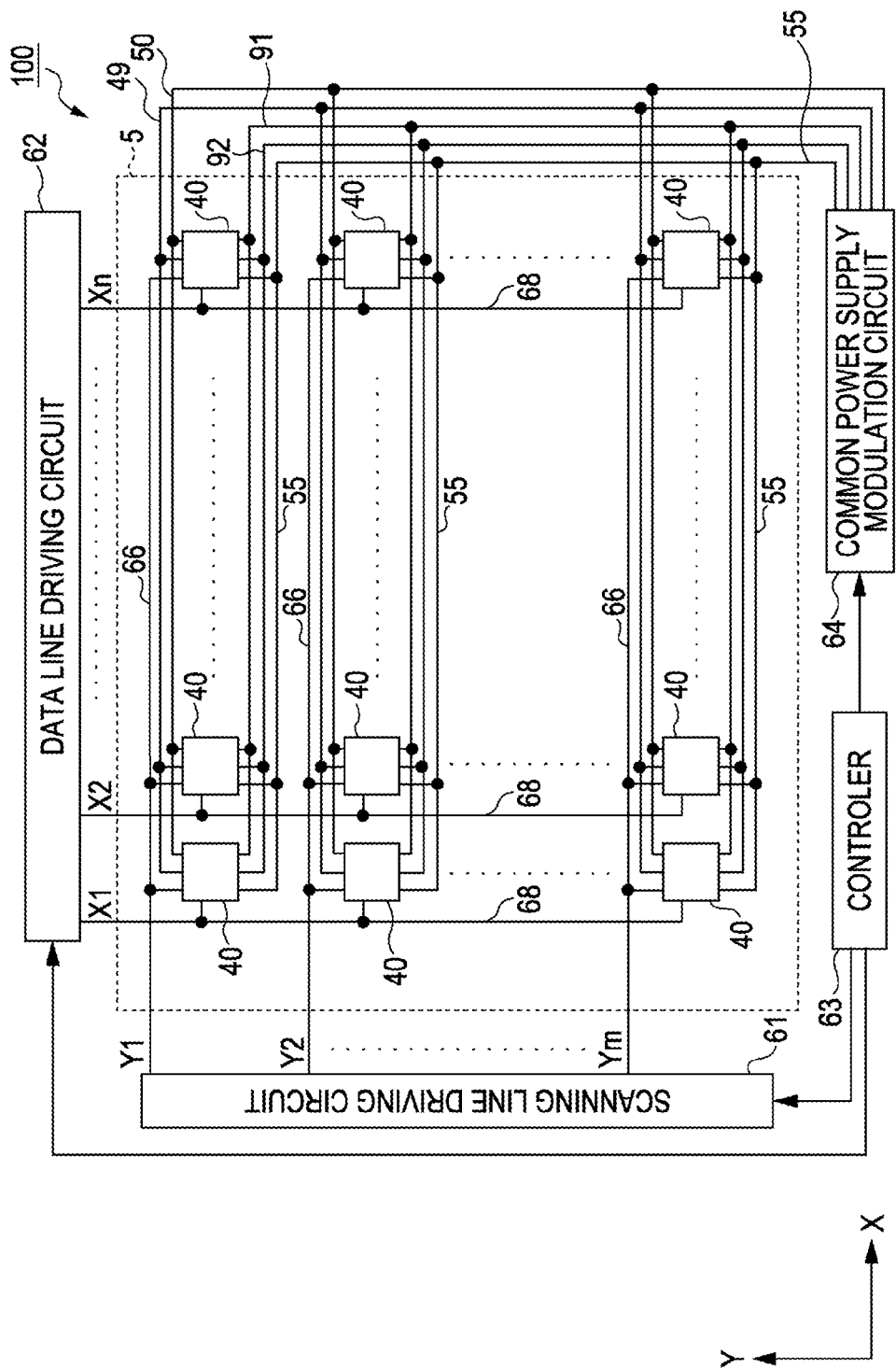
FIG. 1 is a configuration diagram schematically showing an electrophoretic display device in accordance with an embodiment.

FIG. 1 is a configuration diagram schematically showing an electrophoretic display device 100 in accordance with one embodiment of the present invention.

The electrophoretic display device 100 includes a display unit 5 in which a plurality of pixels 40 are arranged in a matrix form. A scanning line driving circuit 61, a data line driving circuit 62, a controller (control unit) 63, and a common power supply modulation circuit 64 are disposed around the display unit 5. The scanning line driving circuit 61, the data line driving circuit 62, and the common power supply modulation circuit 64 are connected to the controller 63. The controller 63 comprehensively controls the scanning line driving circuit 61, the data line driving circuit 62, and the common power supply modulation circuit 64 based on image data or a synchronization signal supplied from an upper device.

The display unit 5 is provided with a plurality of scanning lines 66 extending from the scanning line driving circuit 61, and a plurality of data lines 68 extending from the data line driving circuit 62. The pixels 40 are provided corresponding to intersection positions of the scanning lines 66 and the data lines 68.

The scanning line driving circuit 61 is connected to the pixels 40 through m (Y1, Y2, ..., Ym) scanning lines 66. Under the control of the controller 63, the scanning line driving circuit 61 sequentially selects the scanning lines 66 of $1^{st}$ to $m^{th}$ rows, and supplies a selection signal for specifying the on timing of a select transistor 41 (refer to FIG. 2) provided at the pixel 40 through the selected scanning line 66.

The data line driving circuit 62 is connected to the pixels 40 through n (X1, X2, ..., Xn) data lines 68. Under the control of the controller 63, the data line driving circuit 62 supplies the pixels 40 with image signals for specifying one-bit image data corresponding to the pixels 40.

In addition, in this embodiment, in the case of specifying pixel data "0", the data line driving circuit 62 supplies the pixels 40 with an image signal at a low level (L). In the case of specifying pixel data "1", the data line driving circuit 62 supplies the pixels 40 with an image signal at a high level (H).

Furthermore, the display unit 5 is provided with a low potential power line 49, a high potential power line 50 and a common electrode wiring 55 extending from the common power supply modulation circuit 64, and the respective wirings are connected to the pixels 40. Under the control of the controller 63, the common power supply modulation circuit 64 generates various signals to be supplied to the respective wirings, and performs electrical connection and disconnection (a high impedance state (Hi-Z)) of these wirings.

Figure 2:
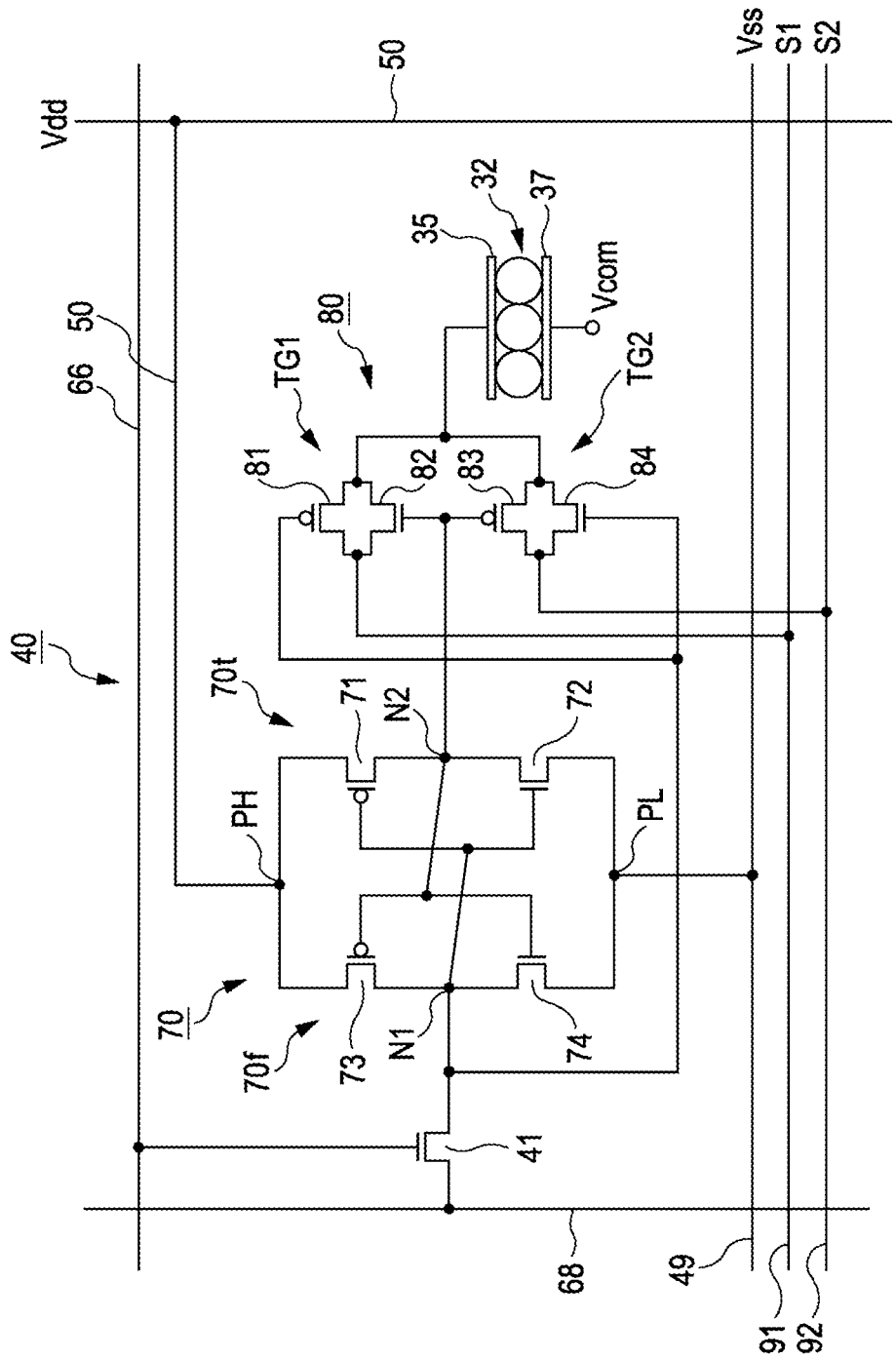
FIG. 2 is a diagram showing a pixel circuit.

FIG. 2 is a circuit configuration diagram of the pixel 40.

The pixel 40 includes a select transistor 41 (a pixel switching element), a latch circuit (a memory circuit) 70, a switch circuit 80, an electrophoretic element 32, a pixel electrode 35, and a common electrode 37. The scanning lines 66, the data lines 68, the low potential power line 49, the high potential power line 50, a first control line 91, and a second control line 92 are connected to the pixel 40. The pixel 40 has a SRAM (Static Random Access Memory) type configuration in which an image signal is held as a potential by the latch circuit 70.

The select transistor 41 is a pixel switching element formed of an N-MOS (Negative Metal Oxide Semiconductor) transistor. The select transistor 41 has a gate connected to the scanning line 66, a source connected to the data line 68, and a drain connected to a data input terminal N1 of the latch circuit 70.

The latch circuit 70 includes a transmission inverter 70t and a feedback inverter 70f. Both the transmission inverter 70t and the feedback inverter 70f are C-MOS inverters. The transmission inverter 70t and the feedback inverter 70f have a loop structure in which an output terminal of the transmission inverter 70t is connected to an input terminal of the feedback inverter 70f, and an output terminal of the feedback inverter 70f is connected to an input terminal of the transmission inverter 70t. The respective inverters receive a supply voltage from the high potential power line 50, which is connected to the inverters through a high potential power terminal PH, and the lower potential power line 49, which is connected to the inverters through a low potential power terminal PL.

The transmission inverter 70t includes a P-MOS (Positive MOS) transistor 71 and an N-MOS transistor 72, which have drains connected to a data output terminal N2. The source of the P-MOS transistor 71 is connected to the high potential power terminal PH and the source of the N-MOS transistor 72 is connected to the low potential power terminal PL. The gates (serve as the input terminal of the transmission inverter 70t) of the P-MOS transistor 71 and the N-MOS transistor 72 are connected to a data input terminal N1 (the output terminal of the feedback inverter 70f).

The feedback inverter 70f includes a P-MOS transistor 73 and an N-MOS transistor 74, which have drains connected to the data input terminal N1. The gates (serve as the input terminal of the feedback inverter 70f) of the P-MOS transistor 73 and the N-MOS transistor 74 are connected to the data output terminal N2 (the output terminal of the transmission inverter 70t).

The switch circuit 80 includes a first transmission gate TG1 and a second transmission gate TG2.

The first transmission gate TG1 includes a P-MOS transistor 81 and an N-MOS transistor 82. The sources of the P-MOS transistor 81 and the N-MOS transistor 82 are connected to the first control line 91, and the drains of the P-MOS transistor 81 and the N-MOS transistor 82 are connected to the pixel electrode 35. Furthermore, the gate of the P-MOS transistor 81 is connected to the data input terminal N1 of the latch circuit 70 and the gate of the N-MOS transistor 82 is connected to the data output terminal N2 of the latch circuit 70.

The second transmission gate TG2 includes a P-MOS transistor 83 and an N-MOS transistor 84. The sources of the P-MOS transistor 83 and the N-MOS transistor 84 are connected to the second control line 92, and the drains of the P-MOS transistor 83 and the N-MOS transistor 84 are connected to the pixel electrode 35. Furthermore, the gate of the P-MOS transistor 83 is connected to the data output terminal N2 of the latch circuit 70 and the gate of the N-MOS transistor 84 is connected to the data input terminal N1 of the latch circuit 70. In addition, the electrophoretic element 32 is interposed between the pixel electrode 35 and the common electrode 37.

In the pixel 40 having the above-described configuration, when an image signal (pixel data "0") at a low level (L) is stored in the latch circuit 70 and a high level (H) signal is output from the data output terminal N2, the first transmission gate TG1 is turned on and a potential S1 supplied through the first control line 91 is input to the pixel electrode 35.

Meanwhile, when an image signal (pixel data "1") at a high level (H) is stored in the latch circuit 70 and a low level (L) signal is output from the data output terminal N2, the second transmission gate TG2 is turned on and a potential S2 supplied through the second control line 92 is input to the pixel electrode 35.

Then, the electrophoretic element 32 is driven based on the potential difference between the potentials S1 and S2 input to the pixel electrode 35 and a potential Vcom input to the common electrode 37 through the common electrode wiring 55 (FIG. 1), so that the pixel 40 is displayed with grayscale according to the input image signal.

Figure 3A:
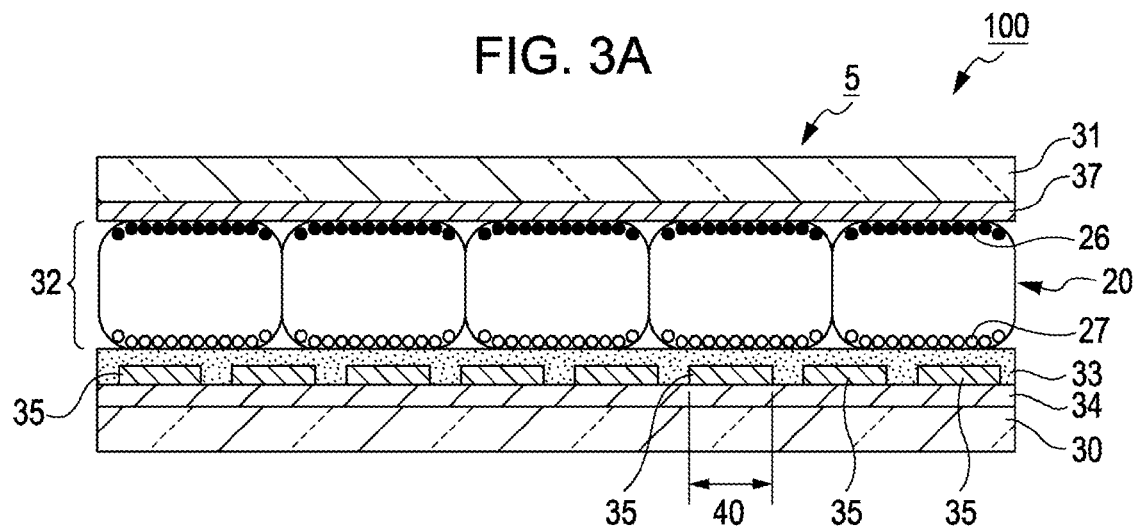
FIGS. 3A and 3B are a partial sectional view of an electrophoretic display device and a sectional view of a microcapsule.

Next, FIG. 3A is a partial sectional view of the electrophoretic display device 100 including the display unit 5. The electrophoretic display device 100 has a configuration in which the electrophoretic element 32 including a plurality of arranged microcapsules 20 is interposed between an element substrate (a first substrate) 30 and an opposite substrate (a second substrate) 31.

In the display unit 5, a circuit layer 34, which includes the scanning line 66, the data line 68, the select transistor 41, the latch circuit 70 and the like shown in FIGS. 1 and 2, is provided to the side of the element substrate 30 facing the electrophoretic element 32, and a plurality of pixel electrodes 35 are arranged on the circuit layer 34.

The element substrate 30 is made of glass, plastic and the like, and may not be transparent because it is disposed at an opposite side of an image display surface. The pixel electrode 35 applies a voltage to the electrophoretic element 32 which is formed by sequentially stacking nickel plating and gold plating on a copper (Cu) foil or made of aluminum (Al), ITO (Indium Tin Oxide) and the like.

Also, the common electrode 37 having a planar shape, which faces the plurality of pixel electrodes 35, is formed at the side of the opposite substrate 31 facing the electrophoretic element 32, and the electrophoretic element 32 is provided on the common electrode 37.

The opposite substrate 31 is made of glass, plastic and the like, and is a transparent substrate because it is disposed on an image display side. The common electrode 37 applies a voltage to the pixel electrodes 35 and the electrophoretic element 32, and is a transparent electrode made of MgAg (magnesium-silver), ITO (Indium Tin Oxide), IZO (Indium Zinc Oxide) and the like.

The electrophoretic element 32 is adhered to the pixel electrodes 35 through an adhesive layer 33 so that the element substrate 30 is bonded to the opposite substrate 31.

In addition, the electrophoretic element 32 is formed in advance at the side of the opposite substrate 31 and is generally treated as an electrophoretic sheet inclusive of the adhesive layer 33. In the manufacturing process, an electrophoretic sheet is treated in the state where a protective release sheet has been adhered to the surface of the adhesive layer 33. Then, the electrophoretic sheet, from which the release sheet has been peeled, is adhered to the separately manufactured element substrate 30 (including the pixel electrodes 35, various circuits and the like), so that the display unit 5 is formed. Thus, the adhesive layer 33 is present only in the side of the pixel electrodes 35.

Figure 3B:
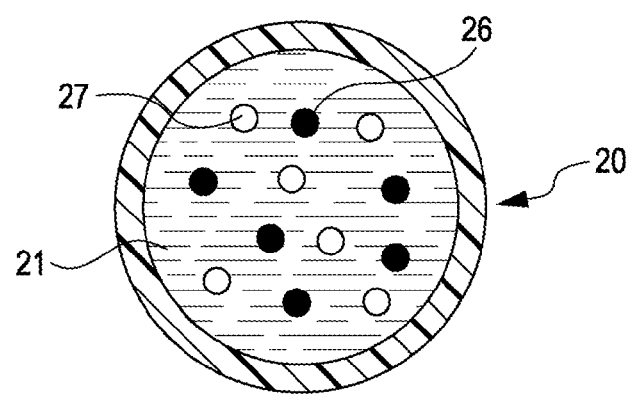

FIG. 3B is a schematic sectional view of the microcapsule 20. The microcapsule 20, for example, has a grain size of about 50 μm, and is a spherical member including a dispersion medium 21, a plurality of white particles (electrophoretic particles) 27, and a plurality of black particles (electrophoretic particles) 26, which are encapsulated therein. As shown in FIG. 3A, the microcapsule 20 is interposed between the common electrode 37 and the pixel electrodes 35, and one or a plurality of microcapsules 20 are disposed in one pixel 40.

The outer shell (wall film) of the microcapsule 20 is formed using acryl resin such as polymethyl methacrylate or polyethyl methacrylate, urea resin, polymeric resin with transparency such as Gum Arabic, and the like.

The dispersion medium 21 is a liquid for dispersing the white particles 27 and the black particles 26 into the microcapsule 20. As the dispersion medium 21, it is possible to exemplify water, an alcohol-based solvent (methanol, ethanol, isopropanol, butanol, octanol, methyl cellosolve and the like), esters (ethyl acetate, butyl acetate and the like), ketones (acetone, methyl ethyl ketone, methyl isobutyl ketone and the like), aliphatic hydrocarbons (pentane, hexane, octane and the like), alicyclic hydrocarbons (cyclo hexane, methyl cyclo hexane and the like), aromatic hydrocarbons (benzene, toluene, benzenes having a long-chain alkyl group (xylene, hexyl benzene, hebutyl benzene, octyl benzene, nonyl benzene, decyl benzene, undecyl benzene, dodecyl benzene, tridecyl benzene, tetra decyl benzene and the like)), halogenated hydrocarbons (methylene chloride, chloroform, carbon tetrachloride, 1,2-dichloroethane and the like), carboxylate, and the like. Furthermore, other oils may be exemplified. These materials may be used by themselves or in a mixture. In addition, a surface active agent and the like may also be mixed therein.

The white particles 27, for example, are particles (polymer or colloid) including white pigments such as titanium dioxide, zinc oxide or antimony trioxide. For example, the white particles 27 are used after being negatively charged. The black particles 26, for example, are particles (polymer or colloid) including black pigments such as aniline black or carbon black. For example, the black particles 26 are used after being positively charged.

It is possible to add a charge control agent including particles such as an electrolyte, a surface active agent, metal soap, resin, rubber, oil, varnish or compound, a dispersion agent such as a titanium-based coupling agent, an aluminum-based coupling agent or a silane-based coupling agent, a lubricant, a stabilizing agent, and the like to the pigments, as is required.

Furthermore, instead of the black particles 26 and the white particles 27, for example, pigments of red, green, blue and the like may also be used. With such a configuration, red, green, blue and the like can be displayed on the display unit 5.

Figure 4A:
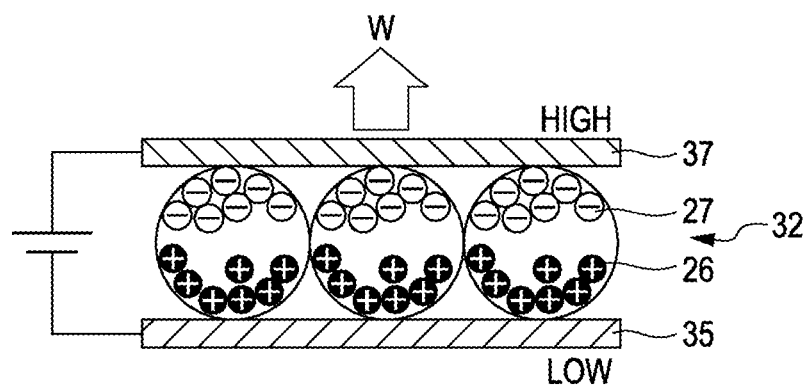
FIGS. 4A and 4B are diagrams explaining the operation of an electrophoretic display device.
Figure 4B:
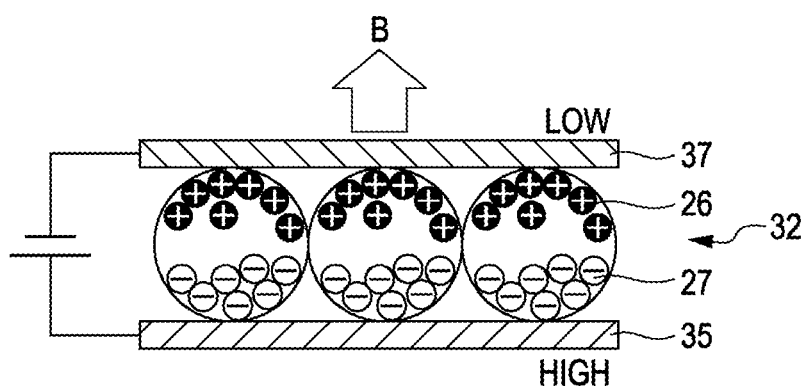

FIGS. 4A and 4B are diagrams explaining the operation of the electrophoretic element. FIG. 4A shows the case where the pixel 40 is displayed in white and FIG. 4B shows the case where the pixel 40 is displayed in black.

In the case of the white display shown in FIG. 4A, the potential of the common electrode 37 is maintained to be relatively high and the potential of the pixel electrode 35 is maintained to be relatively low. Thus, the negatively charged white particles 27 are drawn into the common electrode 37 and the positively charged black particles 26 are drawn into the pixel electrode 35. As a result, when the pixel is viewed from the side of the common electrode 37 serving as a display surface side, white (W) is recognized.

In the case of the black display shown in FIG. 4B, the potential of the common electrode 37 is relatively low and the potential of the pixel electrode 35 is relatively high. Thus, the positively charged black particles 26 are drawn into the common electrode 37 and the negatively charged white particles 27 are drawn into the pixel electrode 35. As a result, when the pixel is viewed from the side of the common electrode 37, black (B) is recognized.

Driving Method

Next, the driving method of the electrophoretic display device in accordance with this embodiment will be described with reference to FIGS. 5 to 8.

Figure 5:
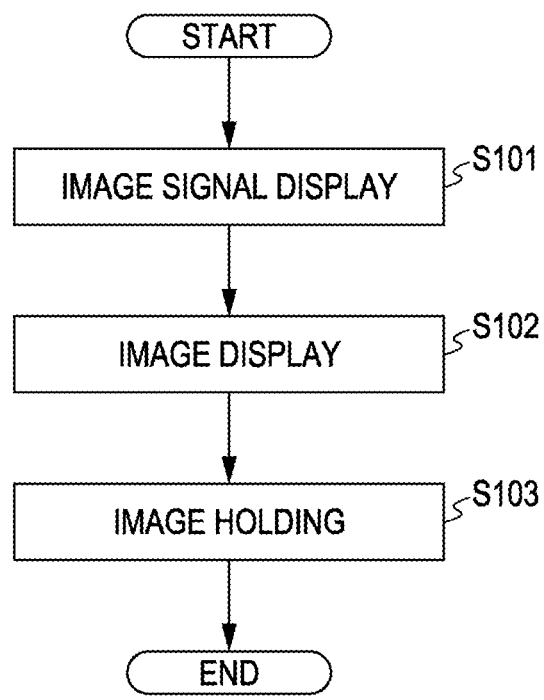
FIG. 5 is a flow chart showing a driving method in accordance with an embodiment.

FIG. 5 is a flow chart showing the driving method of the electrophoretic display device 100.

Figure 6A:
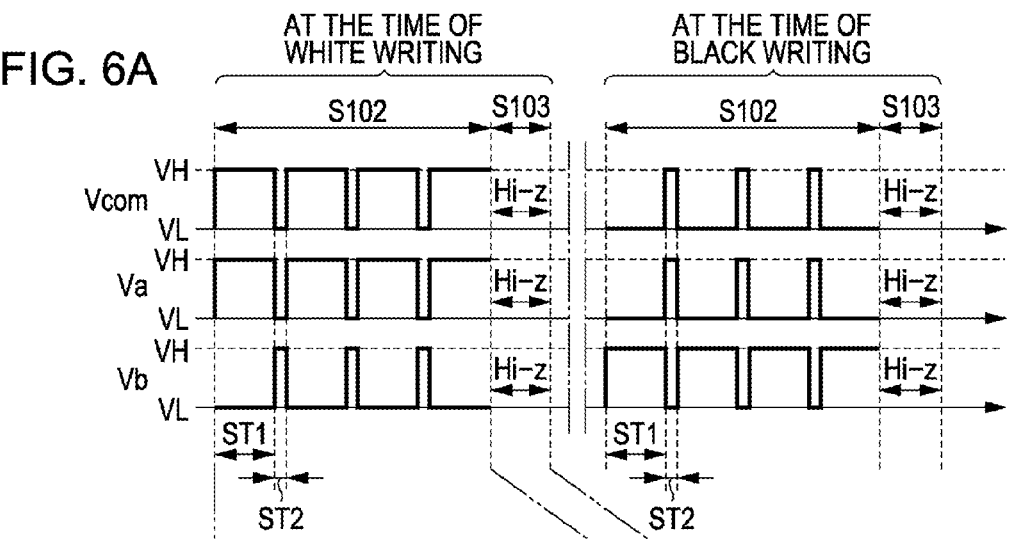
FIGS. 6A to 6C are timing charts corresponding to FIG. 5.
Figure 6B:
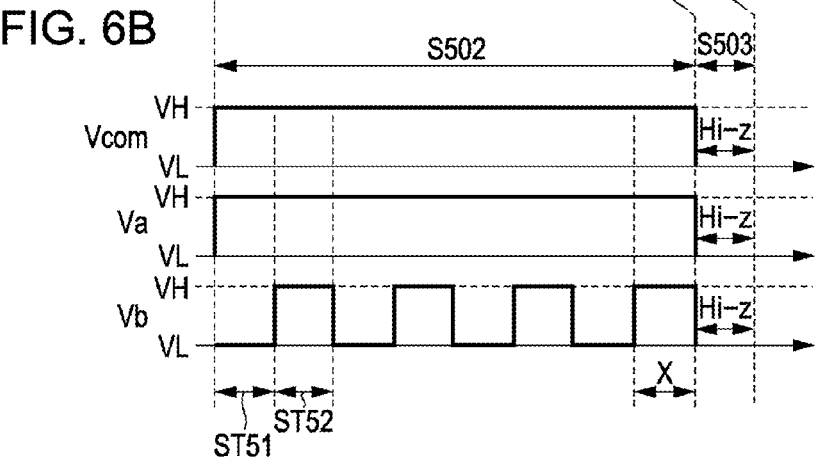
Figure 6C:
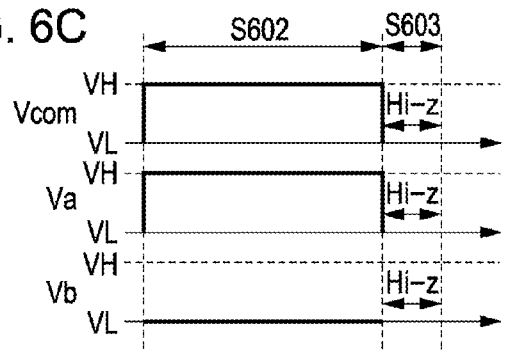

FIG. 6A is a timing chart corresponding to the flow chart of FIG. 5. FIG. 6A shows the potential Vcom of the common electrode 37, the potential Va of the pixel electrode 35 of a pixel 40A, and the potential Vb of the pixel electrode 35 of a pixel 40B. In addition, FIGS. 6B and 6C are timing charts in an existing driving method for the purpose of comparison.

Figure 7A:
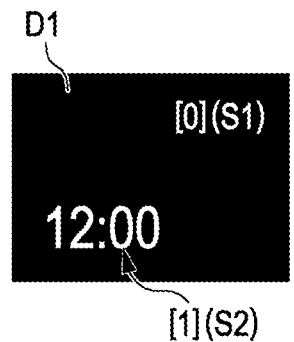
FIGS. 7A to 7D are diagrams explaining transition of image data and a display unit which are used in a driving method of an embodiment.
Figure 7B:
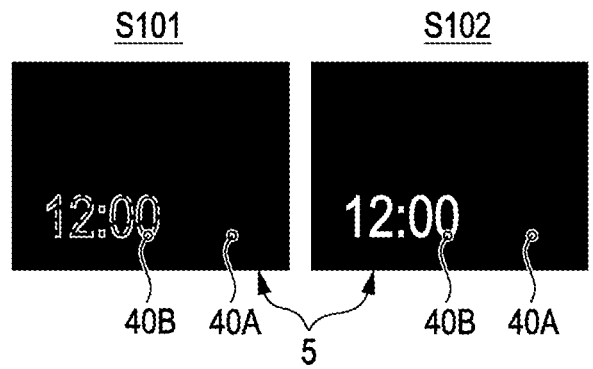

FIGS. 7A and 7B are diagrams explaining image data used in the driving method of this embodiment and a transition state of the display unit 5.

Hereinafter, the case where the pixel 40A is displayed in black and the pixel 40B is displayed in white, which are shown in FIGS. 7A and 7B, and time is displayed in white on the entire surface of the display unit 5 displayed in black will be described.

Furthermore, FIGS. 7A to 7D, since the additional characters "A" and "B" of each reference numeral are used for apparently distinguishing the two pixels 40 (40A and 40B) to be explained from each other, there are no other intentions. In addition, in this embodiment, the potential supplied to each wiring is explained using a detailed numerical example. However, the potential of each wiring is not limited thereto.

As shown in FIG. 5, the driving method in accordance with this embodiment includes step S101 (image signal input), step S102 (image display), and step S103 (image holding).

First, in the display unit 5 before step S101 (image signal input), each circuit is powered off. If step S101 (image signal input) is performed, power is supplied to the scanning line driving circuit 61, the data line driving circuit 62 and the common power supply modulation circuit 64, so that a potential can be supplied through the wiring connected to each circuit. Furthermore, power is also supplied to the latch circuit 70 of the pixel 40 through the high potential power line 50 and the low potential power line 49, so that an image signal can be stored.

In addition, in an actual image display operation, an image removal step, in which the whole of the display unit 5 is changed to the same grayscale and an image is removed, is performed before step S101 (image signal input) or between step S101 (image signal input) and step S102 (image display). In step S101 (image signal input) of FIG. 7B, the entire surface of the display unit 5 is displayed in black through the execution of the image removal step.

After each circuit is powered on, an image signal is input to the latch circuit 70 of each pixel 40. That is, a high level (H; e.g., 7 V) pulse serving as a selection signal is input to the scanning line 66, the select transistor 41 connected to the scanning line 66 is turned on, and the data line 68 and the latch circuit 70 are connected to each other. Thus, the image signal is input to the latch circuit 70. In this embodiment, an image signal corresponding to image data D1 shown in FIG. 7A is input.

In the pixel 40A (the pixel 40 constituting a black background) shown in FIG. 7B, an image signal at a low level (L; e.g., 0 V) is input to the latch circuit 70 from the data line 68 through the select transistor 41. Thus, the potential of the data output terminal N2 of the latch circuit 70 is the same as a high level potential (e.g., 5 V) for image signal input. As a result, in the pixel 40A, the first transmission gate TG1 is turned on, so that the first control line 91 and the pixel electrode 35 are electrically connected to each other.

Meanwhile, in the pixel 40B, an image signal at a high level (H; e.g., 5 V) is input to the latch circuit 70 from the data line 68 through the select transistor 41. Thus, the potential of the data output terminal N2 of the latch circuit 70 is the same as a low level potential (e.g., 0 V). As a result, in the pixel 40B, the second transmission gate TG2 is turned on, so that the second control line 92 and the pixel electrode 35 are electrically connected to each other.

In addition, in step S101 (image signal input), the first control line 91 and the second control line 92 are maintained in a high impedance state. Thus, the display state of the display unit 5 does not change and the whole black display shown in FIG. 7B is maintained.

If image signals are input to the pixels 40A and 40B respectively, step S102 (image display) is performed.

In step S102 (image display), first, the potential Vdd of the high potential power line 50 is increased to a high level potential VH (e.g., 15 V) for a image display from the high level potential for the image signal input. The potential Vss of the low potential power line 49 becomes a low level potential VL (e.g., 0 V) for an image display.

In step S102 (image display), as shown in FIG. 6A, a rectangular pulse shown in FIGS. 6A to 6C is input to the common electrode 37 (potential Vcom). The same rectangular pulse synchronized with the common electrode 37 is input to the first control line 91 (potential S1). A rectangular pulse with a phase shifted by 180°, as compared with the pulse input to the common electrode 37 and the first control line 91, is input to the second control line 92.

Through the above potential input, in the pixel 40A, the rectangular pulse shown in FIGS. 6A to 6C is input to the pixel electrode 35 from the first control line 91 through the first transmission gate TG1. Meanwhile, in the pixel 40B, the rectangular pulse shown in FIGS. 6A to 6C is input to the pixel electrode 35 from the second control line 92 through the second transmission gate TG2.

In step S102 (image display) of this embodiment, in relation to the pixel 40 of the display unit 5, an operation (step ST1 (display driving)), in which the pixel 40B is displayed in white, and an operation (step ST2 (reverse potential driving)), in which the pixel 40B is displayed in black, are alternately performed with respect to the pixel 40B displayed in white plural times. In the example shown in FIGS. 6A to 6C, step ST1 (display driving) is performed four times and step ST2 (reverse potential driving) is performed three times.

In step ST1 (display driving), the high level potential VH is input to the common electrode 37 (Vcom) and the low level potential VL is input to the pixel electrode 35 (Vb) of the pixel 40B. In step ST1 (display driving), in the pixel 40B to which the pixel data "1" corresponding to the white display is input, the pixel electrode 35 has the low level potential VL, and the electrophoretic element 32 is driven by the potential difference between the pixel electrode 35 and the common electrode 37 having the high level potential VH. Thus, the pixel 40B is displayed in white (refer to FIG. 4A).

Furthermore, in step ST1 (display driving), the high level potential VH is input to the pixel electrode 35 (Va) of the pixel 40A. Therefore, in the pixel 40A to which the pixel data "0" corresponding to the black display is input, since the potential of the pixel electrode 35 is the same as the potential of the common electrode 37, the display of the pixel 40A does not change.

In step ST2 (reverse potential driving), the low level potential VL is input to the common electrode 37 and the high level potential VH is input to the pixel electrode 35 (Vb) of the pixel 40B. In step ST2 (reverse potential driving), as shown in FIGS. 6A to 6C, each electrode has a potential which is opposite to those in step ST1 (display driving). Therefore, the pixel electrode 35 of the pixel 40B has the high level potential VH and the common electrode 37 has the low level potential VL, so that the pixel 40B is displayed in black (refer to FIG. 4B).

Furthermore, since the low level potential VL is input to the pixel electrode 35 (Va) of the pixel 40A and the potential of the pixel electrode 35 is the same as the potential of the common electrode 37, the display of the pixel 40A does not change.

Step ST1 (display driving) and step ST2 (reverse potential driving) are alternately repeated plural times, so that as shown in "S102" of FIG. 7B, the pixel 40B corresponding to the time display part of the pixel 40 of the display unit 5 is displayed in white.

Herein, in step S102 (image display) of this embodiment, the pixel 40B for which display switching is performed is displayed in white in step ST1 (display driving) and displayed in black in step ST2 (reverse potential driving). However, as shown in FIGS. 6A to 6C, step ST2 (reverse potential driving) is set to be far shorter than step ST1 (display driving). For example, step ST2 (reverse potential driving) is the time interval which is equal to or more than 10 ms and equal to or less than 20 ms. Since step ST1 (display driving) is performed immediately after step ST2 (reverse potential driving) and thus the pixel is displayed in white, the pixel 40B to be displayed in white is displayed in black or gray, so that a flicker is not recognized by a user.

If step S102 (image display) is ended, step S103 (image holding) is performed.

In step S103 (image holding), as shown in FIGS. 6A to 6C, all of the common electrode 37, the pixel electrode 35 (the first control line 91) of the pixel 40A and the pixel electrode 35 (the second control line 92) of the pixel 40B are in a high impedance state. Consequently, the image of the display unit 5 is held without power consumption.

Preferably, step S103 (image holding) is started by changing the potentials of the pixel electrode 35 and the common electrode 37 to a high impedance state from the state of final step ST1 (display driving) included in step S103 (image holding). Consequently, in step S103 (image holding), during the period until the potentials of the pixel electrode 35 and the common electrode 37 coincide with each other (converged to each other), an electric field of a certain degree can be applied to the electrophoretic particles and a display can be reinforced. That is, in the case of a white display, brightness (reflectance) can be further increased. In the case of a black display, brightness (reflectance) can be further reduced.

Figure 7C:
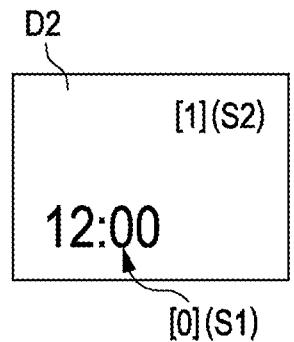
Figure 7D:
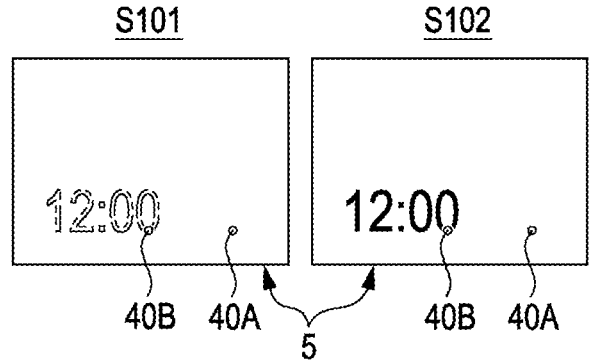

So far, the case where time is displayed in white on a black background has been described. However, the driving method of this embodiment can be applied to the case where time is displayed in black on a white background without any problems as shown in FIGS. 7C and 7D. A timing chart in such a case is shown in a part "at the time of black writing" of FIG. 6A.

In the case where the time is displayed in the black on the white background, for example, image data D2 as shown in FIG. 7C is used. In relation to the image data D2, a black part corresponds to pixel data "0" and a white black part corresponds to pixel data "1". Thus, if an image signal is input to the pixel 40 of the display unit 5 in step S101 (image signal input), in the pixel 40A (the white background part) shown in FIG. 7D, the second transmission gate TG2 is turned on and the second control line 92 and the pixel electrode 35 are electrically connected to each other. Meanwhile, in the pixel 40B (the part in which time is displayed in black), the first transmission gate TG1 is turned on and the first control line 91 and the pixel electrode 35 are electrically connected to each other.

In step S102 (image display), the rectangular pulse shown in the right side of FIG. 6A is input to the common electrode 37, the first control line 91 and the second control line 92.

In detail, in step ST1 (display driving), the common electrode 37 has the low level potential VL, the pixel electrode 35 of the pixel 40A has the low level potential VL, and the pixel electrode 35 of the pixel 40B has the high level potential VH. Thus, the pixel 40B is displayed in black but the display of the pixel 40A does not change.

Furthermore, in step ST2 (reverse potential driving), the common electrode 37 has the high level potential VH, the pixel electrode 35 of the pixel 40A has the high level potential VH, and the pixel electrode 35 of the pixel 40B has the low level potential VL. Thus, the pixel 40B is displayed in white but the display of the pixel 40A does not change.

That is, even in the case shown in FIGS. 7C and 7D, the pixel 40B for which display switching is performed is displayed in black according to image data while being intermittently displayed in white. In the pixel 40A serving as a background, since the pixel electrode 35 and the common electrode 37 maintain the same potential, the display of the pixel 40A does not change in step S102 (image display).

As described above in detail, in accordance with the driving method of the electrophoretic display device 100 of this embodiment, in step S102 (image display), during the operation (step ST1 (display driving)) in which the pixel 40B performing display switching is changed to predetermined grayscale, an operation (step ST2 (reverse potential driving)), in which the pixel 40B is changed to inverse grayscale, is performed.

The driving method as described above is performed, so that desired grayscale can be achieved in a short time as compared with an existing driving method. Hereinafter, effects according to the present invention will be described in detail with reference to FIGS. 6A to 6C and FIG. 8 through the comparison with the existing driving method.

FIGS. 6B and 6C are timing charts when time is displayed in white on a black background as shown in FIG. 7B.

First, in the first example of the existing driving method as shown in FIG. 6B, step S502 (image display) and step S503 (image holding) are sequentially performed. Step S502 (image display) corresponds to step S102 (image display) in the embodiment and step S503 (image holding) corresponds to step S103 (image holding) in the embodiment. Furthermore, in a similar manner to the embodiment, an image signal input step is performed before step S502 (image display).

In the first example of the existing driving method, in step S502 (image display), first step ST51 and second step ST52 are alternately performed plural times (four times), respectively.

In the first step ST51, the high level potential VH is input to the common electrode 37 and the pixel electrode 35 of the pixel 40A and the low level potential VL is input to the pixel electrode 35 of the pixel 40B. Thus, the pixel 40B is displayed in white but the display of the pixel 40A does not change.

In the second step ST52, the high level potential VH is input to the common electrode 37, the pixel electrode 35 of the pixel 40A and the pixel electrode 35 of the pixel 40B, so that they have the same potential. Thus, the display of the pixel 40A and the display of the pixel 40B do not change.

That is, in the first example of the existing driving method as shown in FIG. 6B, an image display operation is performed in such a manner that time is displayed in white based on image data in the first step ST51 and the display of the display unit 5 does not change in the second step ST52.

Next, in the second example of the existing driving method as shown in FIG. 6C, step S602 (image display) and step S603 (image holding) are sequentially performed. Step S602 (image display) corresponds to step S102 (image display) in the embodiment and step S603 (image holding) corresponds to step S103 (image holding) in the embodiment. Furthermore, in a similar manner to the embodiment, an image signal input step is performed before step S602 (image display).

In the second example of the existing driving method, in step S602 (image display), the high level potential VH is input to the common electrode 37 and the pixel electrode 35 of the pixel 40A and the low level potential VL is input to the pixel electrode 35 of the pixel 40B. Thus, the pixel 40B is displayed in white but the display of the pixel 40A does not change.

In the second example of the existing driving method as shown in FIG. 6C, the second step ST52 in the first example is not provided and time is displayed in white through the input of a single rectangular pulse.

Figure 8:
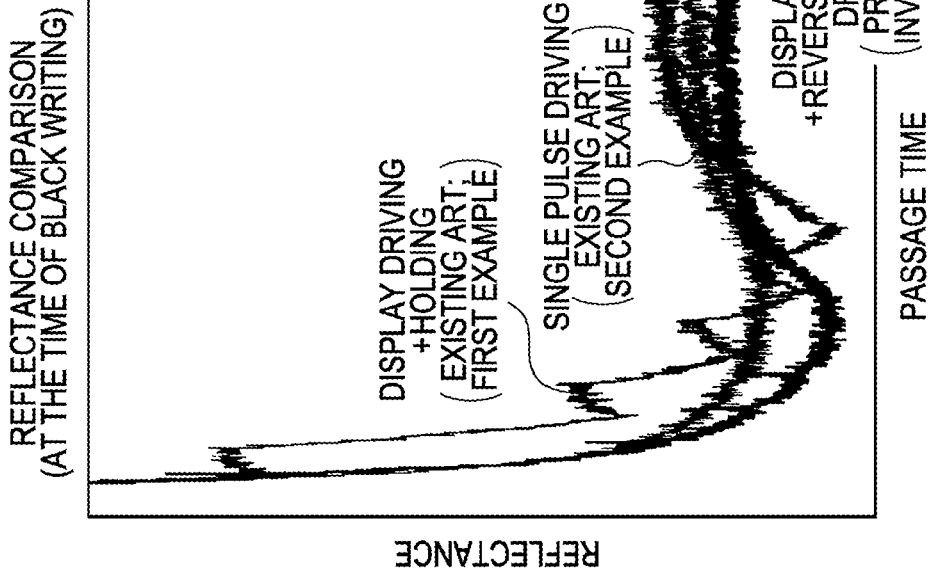
FIG. 8 is a diagram showing a change in reflection with respect to time in a driving method of an embodiment and an existing driving method.

FIG. 8 shows change in reflectance with respect to time when a white display and a black display are performed using the driving method of this embodiment as shown in FIG. 6A and the existing driving method as shown in FIGS. 6B and 6C.

In FIG. 8, the curve of the reflectance according to the driving method of this embodiment as shown in FIG. 6A is labeled with "display driving+reverse potential driving". The curve of the reflectance according to the first example of the existing driving method as shown in FIG. 6B is labeled with "display driving+holding". The curve of the reflectance according to the second example of the existing driving method as shown in FIG. 6C is labeled with "single pulse driving".

As shown in FIG. 8, according to the driving method ("display driving+reverse potential driving") of this embodiment, the change speed (the response speed) of the reflectance is large (fast) and the maximum value (a white display) and a minimum value (a black display) of the reflectance are superior as compared with the existing driving methods. Consequently, according to the driving method of this embodiment, a response is performed at a high speed and a display with a high contrast can be achieved.

It is estimated that the reason for the improvement of the responsiveness according to the driving method of this embodiment as described above is because the electrophoretic particles are stirred by alternately performing step ST1 (display driving) and step ST2 (reverse potential driving) and thus the movement of electrophoretic particles moving in a different direction is facilitated.

Furthermore, it is considered that the reason for the improvement of contrast according to the driving method of this embodiment is because it is possible to prevent white particles from being confined by black particles drawn into the side of the common electrode 37 serving as a display surface when the pixel 40, for example, is changed to a black display from a white display. That is, if the black particles are continuously drawn into the common electrode 37, the white particles once confined by the black particles cannot move any more. However, according to the driving method of this embodiment, since the black particles temporarily move in the direction far away from the common electrode 37 during the period of step ST2 (reverse potential driving), gaps among the black particles are increased, so that the confined white particles may be easily separated from the black particles.

In addition, as shown in FIGS. 6A to 6C, according to the driving method of this embodiment, since the period of step ST2 (reverse potential driving) is extremely short, the time required for step S102 (image display) can be shortened and power consumption can be significantly reduced as compared with the first example of the existing driving method as shown in FIG. 6B. Specifically, for low temperature environments in which it is necessary to lengthen a driving pulse due to the deterioration of responsiveness of the electrophoretic element 32, the present invention is effective for the improvement of the responsiveness and the reduction of power consumption.

Moreover, according to this embodiment, as shown in FIG. 6A, step ST1 (display driving) is performed at the end of step S102 (image display). Consequently, the image display step can be shortened with respect to the period X (which does not contribute to a display) in the first example of the existing driving method as shown in FIG. 6B, so that the reduction of power consumption can be further achieved.

Moreover, according to the driving method of this embodiment, a change in the spike-like reflectance is observed at the timing of step ST2 (reverse potential driving). However, since the observation period is extremely short (10 ms to 20 ms), a change in a display color or a flicker is not recognized by the human eye. However, in the first example of the existing driving method, since the reflectance relapses slightly in the period corresponding to the second step ST52 and the period thereof is short, a flicker of a display may be recognized by a user.

In this embodiment, the lengths of step ST1 (display driving) and step ST2 (reverse potential driving) can be appropriately set according to the characteristics and the like of the electrophoretic element 32.

For example, in the above description, the period of step ST2 (reverse potential driving) is 10 ms to 20 ms. However, the period of step ST2 (reverse potential driving) can be increased in the range in which a flicker due to a change in the reflectance is not recognized. Furthermore, the period of step ST2 (reverse potential driving) can also be shortened. Herein, if the period of step ST2 (reverse potential driving) is shortened, contrast may be reduced because the driving according to this embodiment approaches the single pulse driving according to the second example of the existing driving method.

In addition, if the period of step ST1 (display driving) is excessively long, contrast may be reduced as with the second example of the existing driving method. If the period of step ST1 (display driving) is excessively short, responsiveness may be reduced. In this regard, preferably, the period of step ST1 (display driving) is set such that no problems occur in the above two cases based on actual measurement.

Moreover, according to the previous embodiment, in step S102 (image display) in which a predetermined image is displayed on the display unit 5, step ST1 (display driving) and step ST2 (reverse potential driving) are alternately performed. However, the driving method according to the present invention can also be appropriately applied to the image removal step in which the whole of the display unit 5 is changed to predetermined single grayscale.

For example, using the driving method of "at the time of white writing" as shown in FIG. 6A, the entire surface of the display unit 5 can be displayed in white. Furthermore, using the driving method of "at the time of black writing", the entire surface of the display unit 5 can be displayed in black.

As described above, the driving method as shown in FIG. 6A is applied to the image removal step, the time until the entire surface of the display unit 5 is displayed in white or black can be shortened, and a white display with high reflectance and a black display with low reflectance can be achieved.

MODIFIED EXAMPLE

In the previous embodiment, a SRAM (Static Random Access Memory) type electrophoretic display device in which a latch circuit is provided for each pixel has been described as an example. However, the driving method according to the present invention can also be applied to an active matrix type electrophoretic display device without any problems.

In this modified example, the case where the driving method according to the present invention is applied to a DRAM (Dynamic Random Access Memory) type electrophoretic display device in which a select transistor and a capacitor are provided for each pixel will be described.

Figure 9:
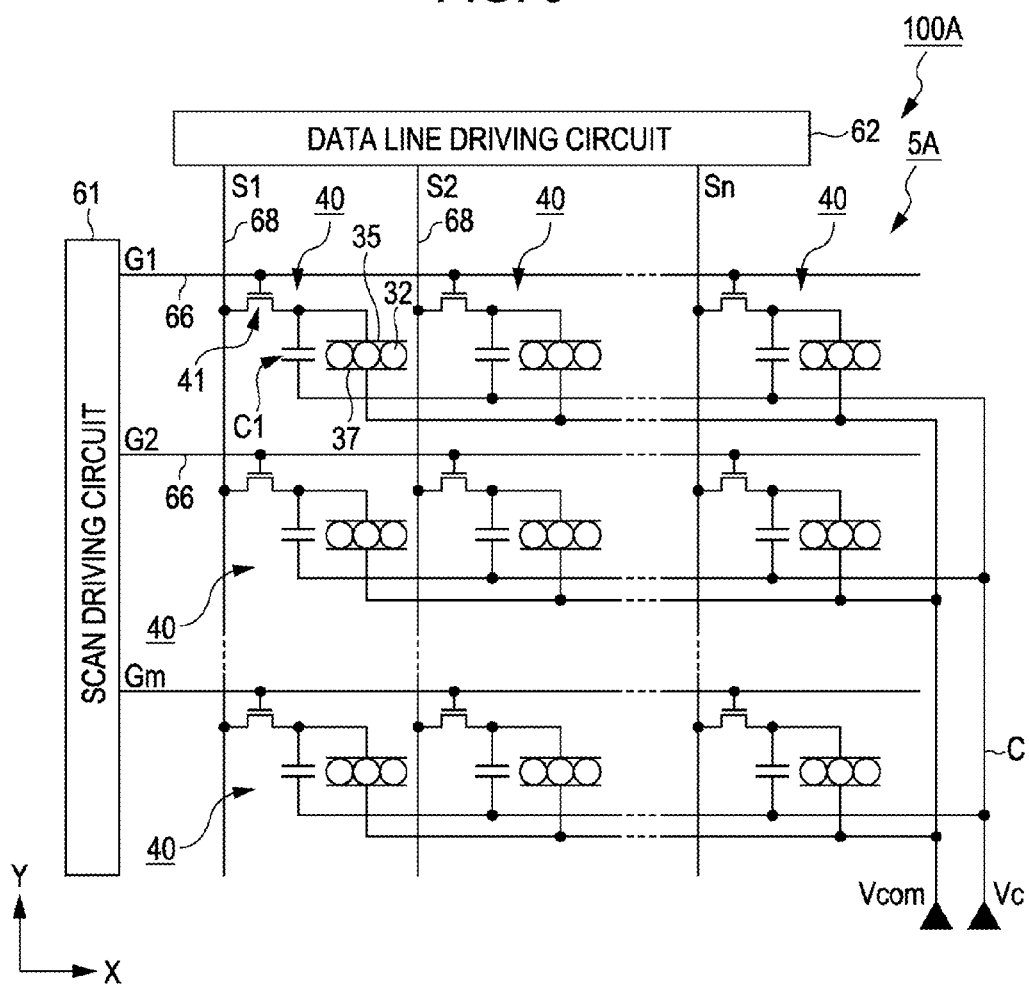
FIG. 9 is a diagram showing an electrophoretic display device in accordance with a modified example.

FIG. 9 is a diagram showing an electrophoretic display device 100A in accordance with the modified example of the previous embodiment.

The electrophoretic display device 100A shown in FIG. 9 includes a display unit 5A in which a plurality of pixels 40 are arranged in a matrix form. The display unit 5A includes a plurality of scanning lines 66 extending in an X axis direction, a plurality of data lines 68 extending in a Y axis direction, and the pixels 40 formed corresponding to intersection portions of the scanning lines 66 and the data lines 68. The scanning lines 66 are connected to a scanning line driving circuit 61 at positions extending outward from the display unit 5A. The data lines 68 are connected to a data line driving circuit 62 at positions extending outward from the display unit 5A.

Each pixel 40 includes a select transistor 41, a holding capacitor C1, a pixel electrode 35, an electrophoretic element 32, and a common electrode 37. The select transistor 41 has a gate connected to the scanning line 66, a source connected to the data line 68, and a drain connected to one electrode of the holding capacitor C1 and the pixel electrode 35. The other electrode of the holding capacitor C1 is connected to a capacitor line C serving as a wiring which is common to the plurality of pixels 40.

In the electrophoretic display device 100A having the above configuration, in the period in which the select transistor 41 is turned on by a selection signal input through the scanning line 66, an image signal supplied through the data line 68 is input to the holding capacitor C1 and the pixel electrode 35, and the electrophoretic element 32 is driven based on the potential difference between the pixel electrode 35 and the common electrode 37. After the select transistor 41 is turned on, the electrophoretic element 32 is driven by energy accumulated in the holding capacitor C1.

In the electrophoretic display device 100A that performs an image display through the above operation, as described in the previous embodiment, a plurality of rectangular pulses cannot be continuously input to the pixel electrode 35.

Meanwhile, in the electrophoretic display device 100A, since the holding capacitor C1 cannot be made large due to the limitation of a pixel size, an image of desired grayscale cannot be displayed on the display unit 5 through a one-time image display operation. In this regard, an image display operation using the same image data is repeated about 30 to 50 times, thereby achieving a display with desired contrast.

Figure 10:
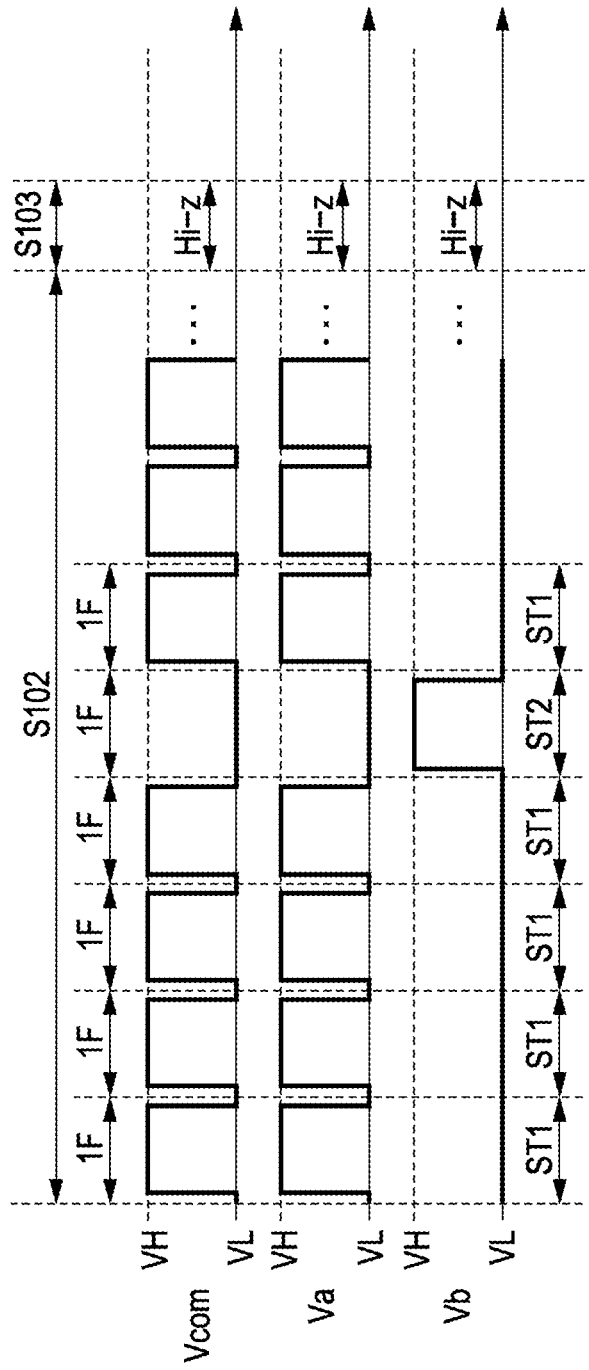
FIG. 10 is a timing chart explaining a driving method in accordance with a modified example.

As shown in FIG. 10, the electrophoretic display device 100A can employ a driving method in which step S102 (image display) is performed through an image writing operation of a plurality of frames and step ST1 (display driving) and step ST2 (reverse potential driving) are assigned to the frames.

The timing chart shown in FIG. 10 is a timing chart when time is displayed in white on a black background in the electrophoretic display device 100A as shown in FIGS. 7A and 7B. Potential Vcom indicates the potential of the common electrode 37, potential Va indicates the potential of the pixel electrode 35 of the pixel 40A (a pixel on a black background) shown in FIG. 7B, and potential Vb indicates the potential of the pixel electrode 35 of the pixel 40B (a pixel in which time is displayed in white) shown in FIG. 7B.

In step ST1 (display driving) in accordance with this embodiment, the high level potential VH is input to the common electrode 37 and the pixel electrode 35 of the pixel 40A and the low level potential VL is input to the pixel electrode 35 of the pixel 40B. Thus, the pixel 40B is displayed in white but the display of the pixel 40A does not change.

Meanwhile, in step ST2 (reverse potential driving), the low level potential VL is input to the common electrode 37 and the pixel electrode 35 of the pixel 40A and the high level potential VH is input to the pixel electrode 35 of the pixel 40B. Thus, the pixel 40B is displayed in black but the display of the pixel 40A does not change.

That is, even in the driving method of this modified example, the operation of each pixel 40 in step ST1 (display driving) and step ST2 (reverse potential driving) is similar to that of the previous embodiment. On the other hand, in this modified example, since the length of step ST1 (display driving) and the length of step ST2 (reverse potential driving) are one frame period, step ST2 (reverse potential driving) is performed once (or plural times) after step ST1 (display driving) is continuously performed plural times (four times in FIG. 10) as shown in FIG. 10.

Consequently, according to the driving method of this modified example, a response speed can be increased and a display with high contrast can be achieved in a similar manner to the previous embodiment.

In addition, even in this modified example, the duration for which step ST1 (display driving) is continuously performed and the duration for which step ST2 (reverse potential driving) is continuously performed can be appropriately set according to the characteristics and the like of the electrophoretic element 32.

Moreover, the driving methods of the electrophoretic display devices in accordance with the above-described embodiment and modified example are not limited to the active matrix type electrophoretic display device as described above, and can also be applied to a segment type electrophoretic display device. In the case of the segment type electrophoretic display device, since an arbitrary potential can be input to a pixel electrode (a segment electrode) at an arbitrary timing, the driving method of the previous embodiment can be applied thereto.

Electronic Apparatus

Next, the case where the electrophoretic display device 100 in accordance with the previous embodiments is applied to the electronic apparatus will be described.

Figure 11:
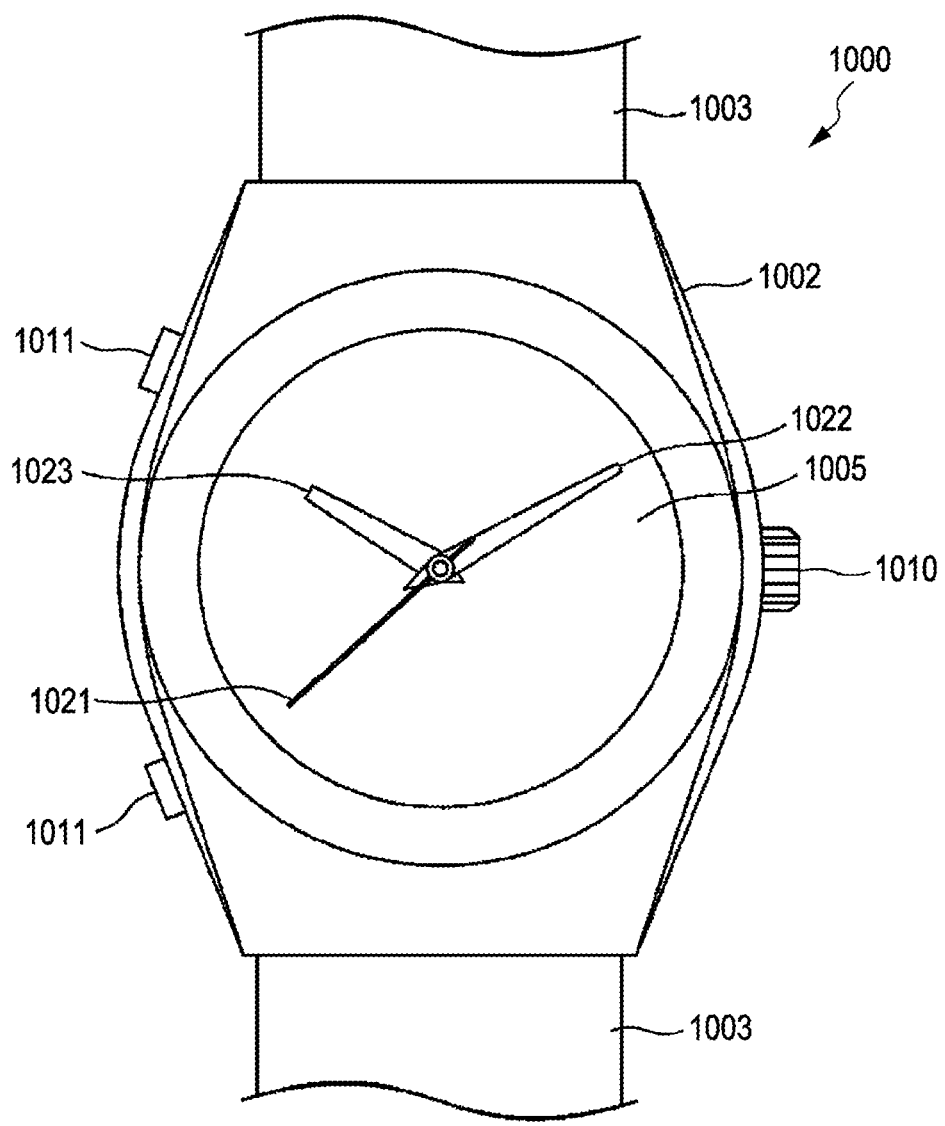
FIG. 11 is a front view of a watch which is one example of an electronic apparatus.

FIG. 11 is a front view of a watch 1000. The watch 1000 includes a watch case 1002 and a pair of straps 1003 connected to the watch case 1002.

The watch case 1002 is provided on the front surface thereof with a display unit 1005 of the electrophoretic display devices 100 in accordance with each embodiment, a second hand 1021, a minute hand 1022 and an hour hand 1023. The watch case 1002 is provided on the side thereof with a winder 1010 as an operating element and an operation button 1011. The winder 1010 is connected to a winding stem pipe (not shown) provided in the case, and is configured to be freely pushed and drawn at multi-steps (e.g., two steps) as one body with the winding stem pipe, and to be freely rotated. The display unit 1005 can display a background image, a character string such as a date or a time, a second hand, a minute hand, an hour hand and the like.

Figure 12:
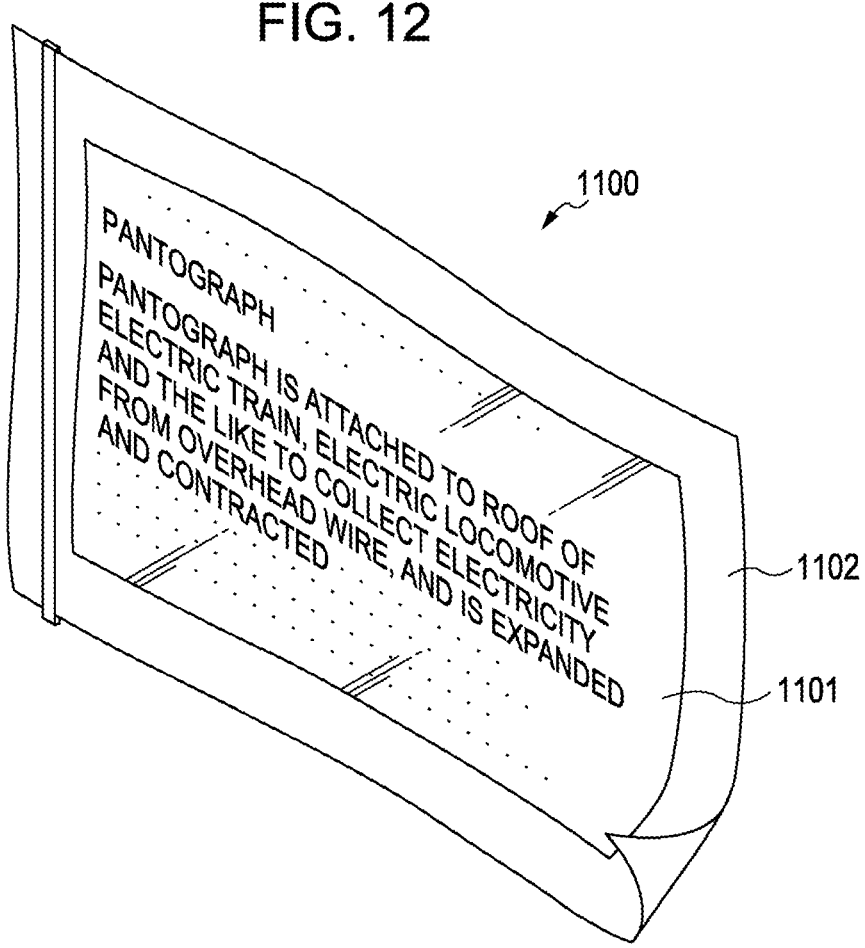
FIG. 12 is a perspective view of an electronic paper which is one example of an electronic apparatus.

FIG. 12 is a perspective view showing the configuration of an electronic paper 1100. The electronic paper 1100 includes the electrophoretic display device 100 of the embodiment in a display area 1101. The electronic paper 1100 has flexibility and includes a body 1102 provided with a rewritable sheet having similar feeling and flexibility to an existing paper.

Figure 13:
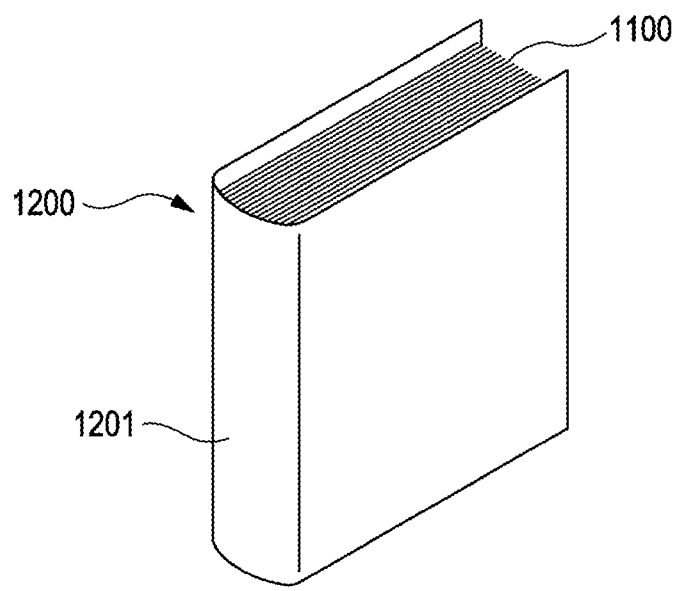
FIG. 13 is a perspective view of an electronic notebook which is one example of an electronic apparatus.

FIG. 13 is a perspective view showing the configuration of an electronic notebook 1200. The electronic notebook 1200 is obtained by binding a plurality of electronic papers 1100 and interposing the electronic papers 1100 in a cover 1201. The cover 1201, for example, is provided with a display data input unit (not shown) that inputs display data sent from an external apparatus. Consequently, in the state where the electronic paper is bound, display contents can be changed or updated according to the display data.

The watch 1000, the electronic paper 1100 and the electronic notebook 1200 employ the electrophoretic display device 100 in accordance with the present invention, resulting in the realization of an electronic apparatus provided with a display unit with superior reliability, which can maintain display quality for a long time.

In addition, the above electronic apparatuses exemplify an electronic apparatus in accordance with the present invention, and do not limit to the technical scope of the present invention. For example, the electrophoretic display device in accordance with the present invention can be appropriately applied to a display unit of an electronic apparatus such as a cell phone or a portable audio system.

The entire disclosure of Japanese Patent Application No.2009-252767, filed Nov. 4, 2009 is expressly incorporated by reference herein.

What is claimed is:

1. A method for driving an electrophoretic display device including a first electrode, a second electrode facing the first electrode, and an electrophoretic element disposed between the first electrode and the second electrode, wherein the method comprising:
   inputting a first potential to the first electrode and inputting a second potential different from the first potential to the second electrode so as to apply a display driving voltage to the electrophoretic element; and
   applying a reverse potential driving voltage to the electrophoretic element, the reverse potential driving voltage having a polarity which is opposite to the display driving voltage,
   wherein the application of the display driving voltage and the application of the reverse potential driving voltage are alternately performed plural times during a single image display period, and
   wherein a pulse width of the display driving voltage is greater than a pulse width of the reverse potential driving voltage in each of the plurality of applications of the display driving voltage and the reverse potential driving voltage.

2. The method according to claim 1, wherein the step of inputting the first potential and the second potential and the step of applying the voltage are alternately performed plural times.

3. The method according to claim 1, wherein whenever the step of inputting the first potential and the second potential is performed plural times, the step of applying the reverse potential driving voltage is performed at least once.

4. The method according to claim 1, wherein a pulse width of a pulse-like voltage input to the first electrode in the step of applying the reverse potential driving voltage is narrower than a pulse width of a pulse-like voltage input to the first electrode in the step of inputting the first potential and the second potential.

5. The method according to claim 4, wherein the pulse width of the pulse-like voltage input to the first electrode in the applying of the reverse potential driving voltage is equal to or more than 10 ms and equal to or less than 20 ms.

6. The method according to claim 1, wherein displaying of an image is ended in the inputting of the first potential and the second potential.

7. The method according to claim 6, further comprising an image holding step of allowing the first electrode and the second electrode to be in a high impedance state after the step of displaying the image, wherein the image holding step is started by changing the potentials of the first electrode and the second electrode to be in the high impedance state from a final state of the step of inputting the first potential and the second potential, which is included in the step of displaying the image.

8. The method according to claim 1, wherein the electrophoretic display device further including:
   a plurality of pixels; and
   a plurality of the first electrodes, each of the plurality of the first electrodes being disposed at one of the plurality of the pixels,
   wherein the second electrode faces the plurality of the first electrodes, and
   wherein in the step of inputting the first potential and the second potential, all pixels of the display unit are changed to the same grayscale.

9. An electrophoretic display device comprising:
   a first electrode;
   a second electrode facing the first electrode;
   an electrophoretic element disposed between the first electrode and the second electrode; and
   a controller that controls a potential of the first electrode and a potential of the second electrode,
   wherein, the controller performs a potential writing operation for inputting a first potential to the first electrode and inputting a second potential different from the first potential to the second electrode so as to apply a display driving voltage to the electrophoretic element, and a reverse potential driving operation for applying a reverse potential driving voltage to the electrophoretic element, the reverse potential driving voltage having a polarity which is opposite to the display driving voltage,
   wherein the application of the display driving voltage and the application of the reverse potential driving voltage are alternately performed plural times during a single image display period, and
   wherein a pulse width of the display driving voltage is greater than a pulse width of the reverse potential driving voltage in each of the plurality of applications of the display driving voltage and the reverse potential driving voltage.

10. The electrophoretic display device according to claim 9, wherein the potential writing operation and the reverse potential driving operation are alternately performed plural times.

11. The electrophoretic display device according to claim 9, wherein whenever the potential writing operation is performed plural times, the reverse potential driving operation is performed at least once.

12. The electrophoretic display device according to claim 9, wherein a pulse width of a pulse-like voltage input to the first electrode in the reverse potential driving operation is narrower than a pulse width of a pulse-like voltage input to the first electrode in the potential writing operation.

13. The electrophoretic display device according to claim 12, wherein the pulse width of the pulse-like voltage input to the first electrode in the reverse potential driving operation is equal to or more than 10 ms and equal to or less than 20 ms.

14. The electrophoretic display device according to claim 9, wherein an image display operation is ended in the potential writing operation.

15. The electrophoretic display device according to claim 14, wherein an image holding operation for allowing the first electrode and the second electrode to be in a high impedance state is further performed after the image display operation, and the image holding operation is started by changing the potentials of the first electrode and the second electrode to be in the high impedance state from a final state of the potential writing operation, which is included in the image display operation.

16. The electrophoretic display device according to claim 9, further comprising:
   a plurality of pixels;
   a plurality of the first electrodes, each of the plurality of the first electrodes being disposed at one of the plurality of the pixels,
   wherein the second electrode faces the plurality of the first electrodes, and
   wherein in the potential writing operation, all pixels of the display unit are changed to the same grayscale.

17. An electronic apparatus comprising the electrophoretic display device according to any one of claims 9 to 16.

* * * * *